United States Patent [19]
Ellis

[11] Patent Number: 5,878,801
[45] Date of Patent: Mar. 9, 1999

[54] DEVICE FOR SEALING A TUBELESS PNEUMATIC TIRE TO A WHEEL RIM

[76] Inventor: Joe D. Ellis, P.O. Box R, Gilbert, W. Va. 25621

[21] Appl. No.: 847,511

[22] Filed: Apr. 24, 1997

[51] Int. Cl.⁶ .................................................. B60C 25/12
[52] U.S. Cl. .............................................................. 157/1.1
[58] Field of Search ................................ 157/1, 1.1, 1.17, 157/1.2, 1.22, 1.24

[56] References Cited

U.S. PATENT DOCUMENTS

| | | |
|---|---|---|
| 3,552,469 | 1/1971 | Corless . |
| 3,683,991 | 8/1972 | Ruhland et al. . |
| 3,814,163 | 6/1974 | Charles et al. . |
| 3,851,695 | 12/1974 | Kimberly . |
| 3,866,654 | 2/1975 | Duquesne . |
| 4,744,402 | 5/1988 | St-Hilaire . |
| 5,056,576 | 10/1991 | Iori . |
| 5,072,764 | 12/1991 | Ochoa . |
| 5,072,765 | 12/1991 | Kane et al. . |
| 5,168,911 | 12/1992 | Gottschalk . |
| 5,247,982 | 9/1993 | Miller . |
| 5,456,302 | 10/1995 | Demers . |
| 5,570,733 | 11/1996 | Desparois et al. . |

*Primary Examiner*—D. S. Meislin
*Attorney, Agent, or Firm*—Oliff & Berridge, PLC

[57] ABSTRACT

A pneumatic tire sealing device that seals the beads of a tire to a wheel rim preferably includes a split nozzle that directs pressurized air in two diverging directions such that when the split nozzle is inserted between a tubeless pneumatic tire and a wheel rim, the air exiting through the split nozzle will travel in opposite directions around the wheel rim and within the tire. The tire sealing device also can include a locking mechanism by which the tire sealing device is safely and securely locked to the wheel rim during the sealing process. This prevents the tire sealing device from being propelled away from the wheel (and vice versa) when a burst of pressurized air is discharged through the nozzle. The locking mechanism can be used with tire sealing devices that include standard nozzles as well as those having a split nozzle. Other safety features also are disclosed.

24 Claims, 3 Drawing Sheets

DEVICE FOR SEALING A TUBELESS PNEUMATIC TIRE TO A WHEEL RIM

BACKGROUND OF THE INVENTION

1. Field of Invention

This invention relates to a pneumatic device for use in sealing a tubeless tire to a wheel rim.

2. Description of Related Art

When a tubeless tire that is to be inflated is fitted onto a wheel, typically the beads of the tire do not seal against the wheel rim. Accordingly, when pressurized air is supplied to the valve stem of the wheel, the air escapes from the inside of the tire through the space that exists between the beads of the tire and the wheel rim, making it difficult to inflate the tire. This problem is even more acute with larger sized tires/wheels, for example, those used on trucks and heavy-duty earth moving equipment, due to the increased weight and dimensions of the tires. Since such tires usually are inflated while in a horizontal orientation, the uninflated tire sags, which increases the size of the space through which air escapes. Numerous methods and tools have been developed in an attempt to solve the above described problem.

One method entailed igniting ether within the tire. The resulting explosion usually would temporarily seal the beads of the tire to the wheel rim so that the tire could be inflated. This technique is dangerous and has led to the death of individuals.

It is also known to apply a soapy liquid to the beads of the tire to assist in sealing the tire beads to the wheel rim. This technique is not always successful, particularly on larger tires. It also results in the interior of the tire becoming coated with the soapy liquid, which can make it difficult to apply a patch to the interior of the tire if the tire should become punctured during normal use.

Pneumatic tire sealers have been developed to rapidly inject air into the tire, between a bead of the tire and the wheel rim, so as to seal the beads of the tire to the wheel rim.

Some of these tire sealing devices require the user to place a ring-shaped tubular member around the circumference of the space formed between a bead of the tire and the wheel rim. Examples of pneumatic tire sealing devices having curved tubular members are shown in U.S. Pat. Nos. 3,552, 469; 3,683,991; 3,814,163; 3,851,695 and 5,247,982. While these devices seal the beads of a tubeless tire onto a wheel rim, they are not easily adaptable to different sized tires or rims. These devices also can require a substantial amount of time in the preparation of the equipment prior to the sealing process.

Other devices for injecting air into a tire between a bead of the tire and the wheel rim are disclosed in U.S. Pat. Nos. 4,744,402; 5,056,576; 5,072,765; 5,168,911 and 5,456,302. These devices are expensive, bulky (and therefore not readily portable—and certainly not a "handheld" device) and cumbersome to use.

U.S. Pat. No. 5,570,733 to Desparois et al. discloses a hand-held tool for inflating tires. The tool includes an injection head for directing a valve controlled, large volume, high pressure jet of air into the cavity of a deflated tire. The tool includes an ON/OFF valve that is biased to the OFF position for safety purposes and also includes clips (posts) to assist in positioning the tool on the wheel rim. Although the ON/OFF valve provides a limited safety function, it does not prevent over-inflation of the tire. The clips do not hold the tool and the rim together, and therefore fail to prevent the tool from being inadvertently propelled away from the wheel (and toward the user) when the burst of air is discharged from the tool, which could lead to injury.

U.S. Pat. No. 3,866,654 to Duquesne discloses a device for inflating tubeless tires. The device provides a conventional tire inflating hose for attachment to the tire valve during inflation. However, the device lacks a multi-directional nozzle and its design leaves open the possibility of the nozzle becoming stuck between the tire and rim, thereby preventing a complete seal. The device also suffers from all of the disadvantages discussed above with respect to U.S. Pat. No. 5,570,733.

U.S. Pat. No. 5,072,764 to Ochoa discloses a device for sealing tubeless tires using a hand operated valve for releasing a blast of air from a storage tank. The device has a pressure limiting valve, but only limits the pressure in the tank and not the tire, leaving the tire exposed to possible overpressurization.

SUMMARY OF THE INVENTION

It is an object of the invention to provide a pneumatic tire sealing device that has a nozzle designed for efficiently discharging pressurized air into a tire that is to be sealed to a wheel rim.

It is another object of the invention to provide a pneumatic tire sealing device that prevents the over-inflation of a tire.

It is another object of the invention to provide a pneumatic tire sealing device that protects the user from harm.

In order to achieve the above and other objects, and to overcome the shortcomings in the prior art, a pneumatic tire sealing device according to one aspect of the invention includes a split nozzle designed for efficiently and safely discharging pressurized air into a tire so the tire can be sealed to a wheel rim. The split nozzle directs the pressurized air in two diverging directions such that when the split nozzle is inserted between a tubeless pneumatic tire and a wheel rim, the air exiting through the split nozzle will travel in opposite directions around the wheel rim and within the tire.

Preferably, the pneumatic tire sealing device is fabricated from structural material (e.g., metal) components welded together, as well as couplings, a pressure gauge, valves (ON/OFF and/or safety) and hoses in fluid relationship with each other. The tire sealing device can have an air-conveying housing with an inlet passage and the split nozzle. The inlet passage is connected to a source of pressurized air. Preferably, the air conveying housing has first and second chambers that connect the inlet passage with opposite sides of the split nozzle. A connector joins the inlet passage to the pressurized air source.

A manually actuable ON/OFF valve preferably is provided. The ON/OFF valve can be attached to the inlet passage to allow the user to control the supply of pressurized air to the housing. A pressure measuring gauge also can be attached to the connector.

Preferably, one end of an inflation tube is attached to the connector, while a second end of the inflation tube is attachable to a tire valve in the traditional manner. The inflation tube discharges the pressurized air into the tire to inflate the tire (through the tire valve) once the tire has been sealed to the wheel rim.

In a preferred embodiment, a pressure-relief, or "pop-off," safety valve is provided between the source of pressurized air and the housing and inflation tube. This can be accomplished by providing the safety valve in the connector upstream of the point where the inflation tube is attached.

The safety valve prevents the overpressurization of the tire through the nozzle or through the inflation tube.

A support flange affixed adjacent to the split nozzle engages the wheel rim and provides for the support and positioning of the device during operation.

According to another aspect of the invention, a handheld tire sealing device having an air-conveying housing and nozzle is provided with a locking mechanism that enables the device to be locked to the wheel rim. When locked to the wheel rim, the locking mechanism prevents the tire sealing device from being propelled away from the wheel rim during the discharge of pressurized air through the nozzle. Thus, the locking mechanism provides a safety function. The locking mechanism preferably is attached to (e.g., by welding) the air-conveying housing and is removably attachable to the wheel rim so as to secure the housing to the rim during the sealing of the tire.

The locking mechanism is operable between locked and unlocked positions. Preferably a locking member, for example a locking pin, can be provided so as to lock the locking mechanism in the locked position. The locking mechanism can also include an adjustable member so that the locking mechanism, and thus the tire sealing device, can be used with wheel rims having a variety of different sizes.

The resulting pneumatic tire sealing device seals the tire to the rim more efficiently than conventional tire sealing devices. Also, the multiple safety features, including the popoff safety valve and the locking mechanism reduce the possibility of harm to the user and over-inflation of the tire. Consequently, the present tire sealing device can be used more easily, safely and with more confidence.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
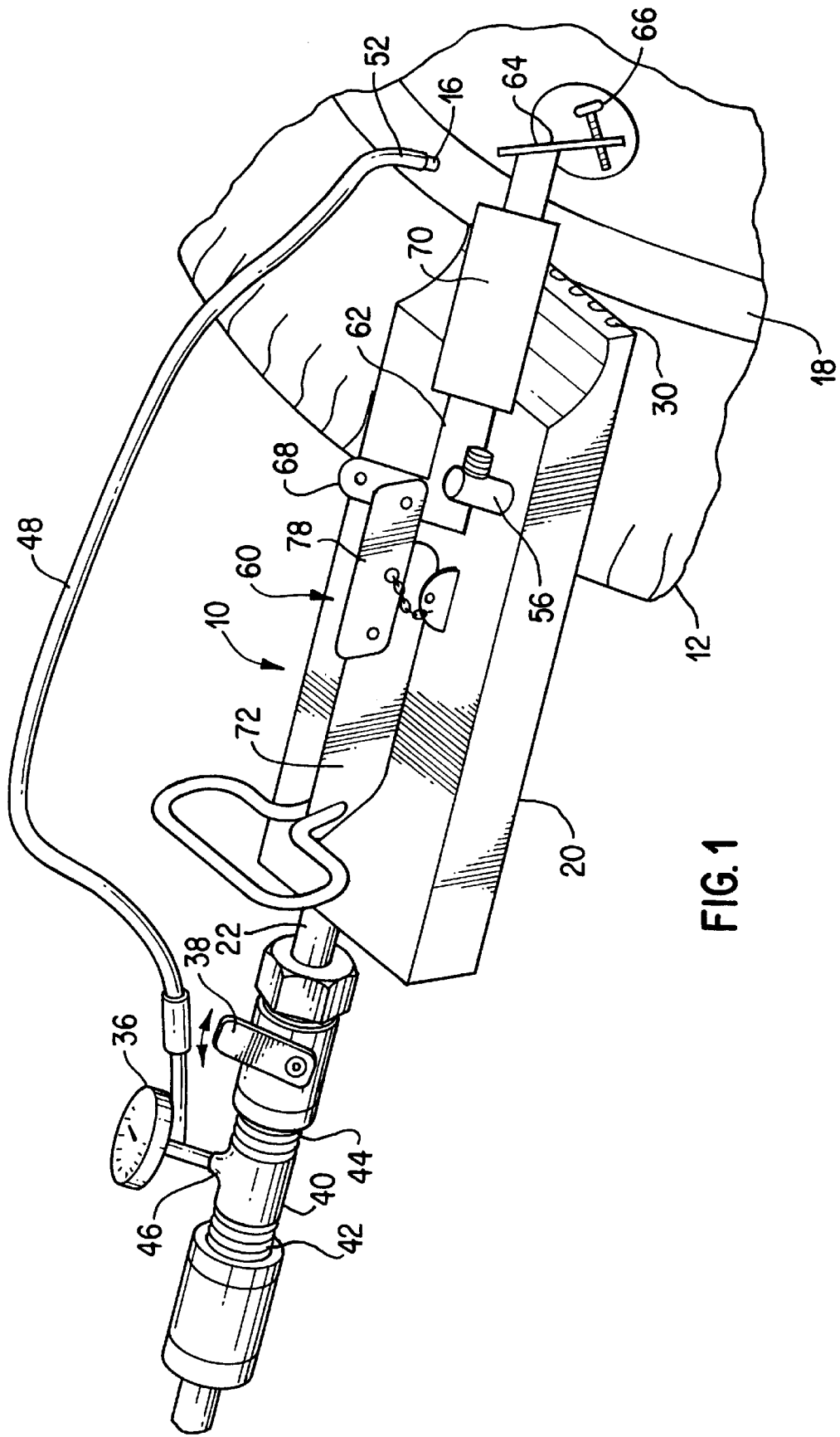
FIG. 1 is a perspective view of a tire sealing device according to a preferred embodiment of the present invention, the device being in a position where it is locked to a wheel rim.

FIG. 1 is a perspective view of a tire sealing device according to one preferred embodiment of the present invention. Pneumatic tire sealing device 10 includes a air-conveying housing 20 having an inlet passage 22 and a split nozzle 30. A source of pressurized air and an air line, both not shown, are in communication with inlet passage 22, by connector 40. Connector 40 has first, second, and third openings 42, 44 and 46, respectively. First opening 42 is attached to the air line and to the source of pressurized air. Second opening 44 is attached to inlet passage 22. Third opening 46 will be discussed in more detail below. As will also be discussed in more detail below, when pressurized air is supplied to housing 20 and discharged through split nozzle 30, an instantaneous increase in the pressure within the tire 12 forces the tire beads 14 to seal with the wheel rim 18 (see FIG. 5).

Figure 4:
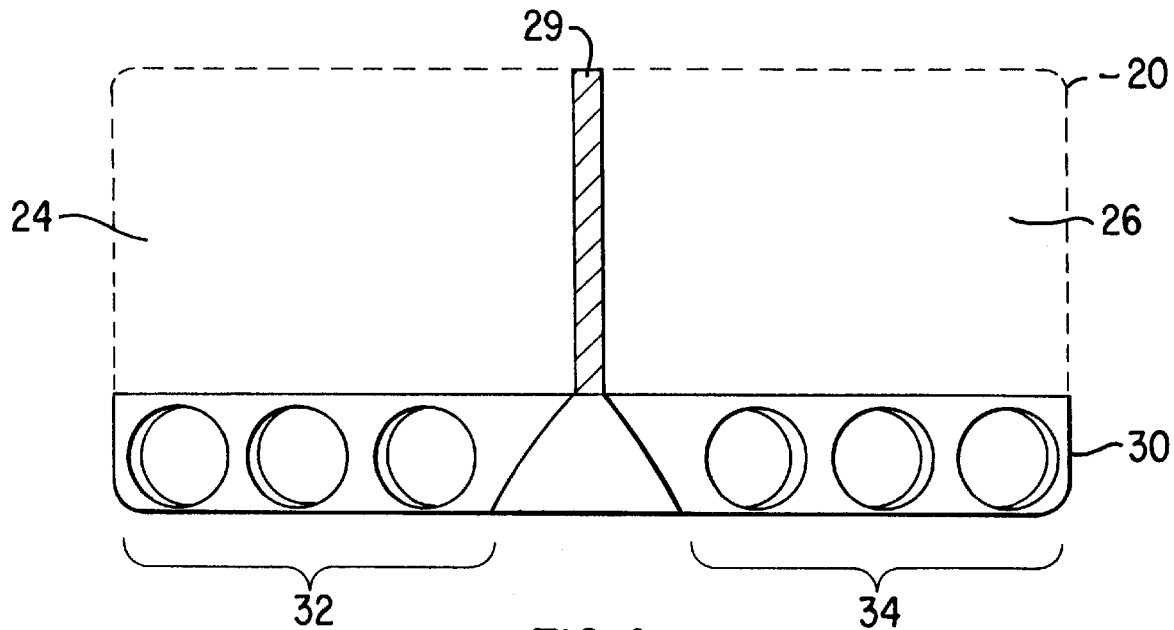
FIG. 4 is a front view of the split nozzle in the FIG. 1 device.
Figure 5:
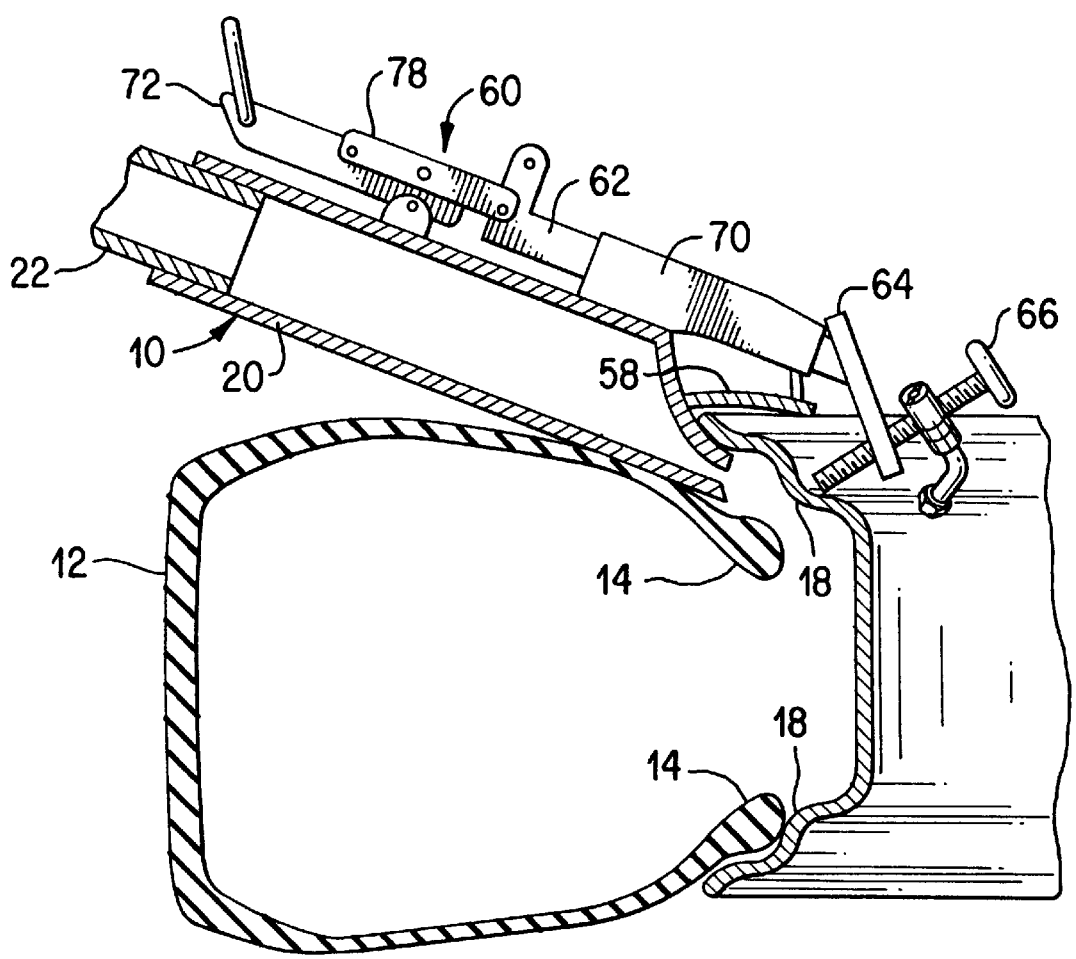
FIG. 5 is a side view, in partial section, showing the tire sealing device positioned in relation to a wheel rim and tire to perform the operation of sealing the tire beads against the rim flange.

Referring to FIG. 4, in a preferred embodiment, the housing 20 is fabricated from structural material (e.g., metal) components that are welded together. A partitioning wall 29 extends longitudinally through a center of the housing (i.e., from the inlet passage 22 to the nozzle 30). As a result, the housing 20 has first and second chambers 24 and 26 that respectively connect the inlet passage 22 with a first nozzle 32 and a second nozzle 34 of the split nozzle 30. First nozzle 32 and second nozzle 34 direct pressurized air in two diverging directions such that when split nozzle 30 is inserted between a tubeless pneumatic tire 12 and wheel rim 18 (as shown in FIGS. 1 and 5), the air discharged through the split nozzle 30 will travel in opposite directions around rim 18 and within the tire 12. As described above, this causes the tire to rapidly expand so that the tire beads temporarily seal against the wheel rim. As further air is introduced into the tire, for example, through the valve stem of the wheel, the tire is inflated to the desired pressure, and the seal between the tire and wheel is maintained. As can best be seen in FIG. 5, the split nozzle 30 is configured to be easily inserted between tire 12 and rim 18 before sealing, as well as for easy removal after sealing.

It is believed that the split nozzle enables the tire to be more quickly sealed to the wheel rim than would be possible with simple, straight, single nozzles. The split nozzle ensures that pressurized air will be directed in two opposite directions around the wheel rim and within the tire. This causes the tire to rapidly expand and seal more quickly, possibly due to the increased turbulence caused by the two streams of air and/or the fact that no single air stream needs to travel completely around the circumference of the wheel.

Returning to FIG. 1, a manually actuable ON/OFF valve 38 is attached to inlet passage 22 and permits the operator to control the supply of pressurized air to housing 20. In the illustrated embodiment, the ON/OFF valve 38 is a commercially available rotatable valve. Other ON/OFF valves can be used, including valves that are biased to the OFF position as disclosed in U.S. Pat. No. 5,570,733.

Preferably, a pressure measuring gauge, such as pressure measuring gauge 36, is attached to third opening 46 of connector 40 and measures the pressurized air leaving the split nozzle 30. A first end of an inflation tube 48 is also attached to third opening 46 of connector 40. A second end of tube 48 includes a fitting 52 that is attachable to tire valve 16 in the standard manner. The inflation tube 48 enables the tire to be inflated during the sealing process. Of course, a separate inflation tube from a separate source of air could be used as an alternative. However, the configuration shown in FIG. 1 is convenient, easy to use, and reduces the amount of equipment that needs to be handled.

Preferably, connector 40 includes a pressure limiting valve located, for example, upstream of openings 44 and 46. Such a pressure limiting valve prevents the maximum pressure achieved within the tire from exceeding a predetermined level, for example, 50 psi.

As a further safety precaution, a pressure-relief, or "popoff", valve 56 can be provided in fluid communication with the housing 20. When the pressure within the housing 20 exceeds a maximum level (e.g., 50 psi), the valve 56 opens, thereby preventing the over pressurization of the tire 12.

Figure 2:
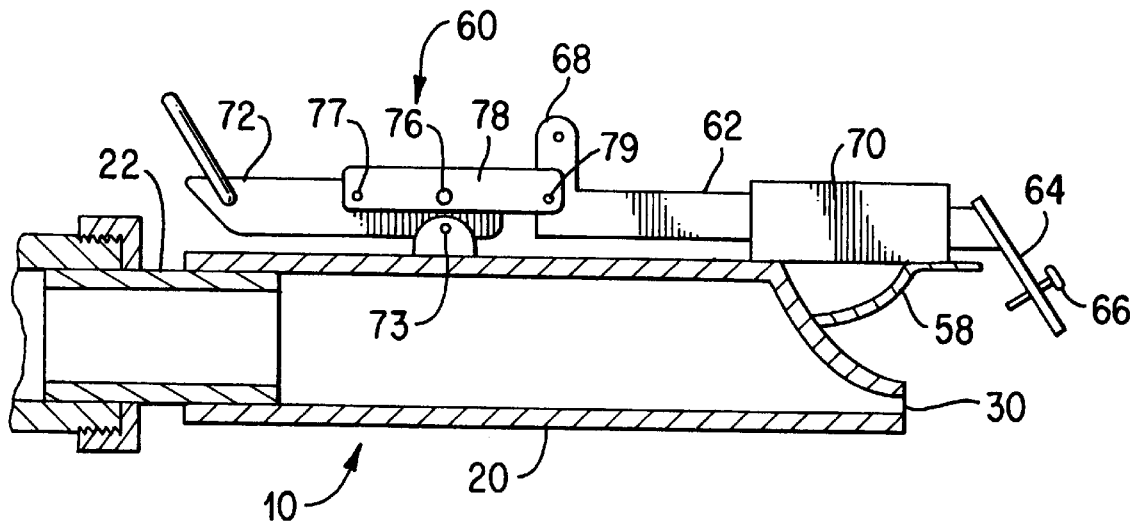
FIG. 2 is a partial sectional view of the tire sealing device of FIG. 1 in the locked position.

FIG. 2 is a side, partially sectional view of the tire sealing device of FIG. 1. As can be seen from FIG. 2, a support flange 58 is located above the split nozzle 30. Flange 58 engages wheel rim 18 and provides support to device 10 during operation so that the user does not support the entire weight of the device. Flange 58 also is shaped and arranged so that the end of the nozzle 30 is optimally located during use as shown, for example, in FIG. 5.

Another aspect of the invention relates to a locking mechanism for locking the tire sealing device to the wheel during the sealing process. The locking mechanism improves the safety of the tire sealing device by preventing it from being accidentally propelled away from the wheel (or vice versa) when the blast of pressurized air is discharged from the tire sealing device. Preferably, the locking mechanism is used with a tire sealing device having the split nozzle described above so as to take advantage of both features. The locking mechanism also can be used with tire sealing devices having nozzles other than a split nozzle, for example, simple single nozzles as disclosed in some of the patents referenced above. A preferred design for the locking mechanism will now be described.

Locking mechanism 60 is attached (e.g., welded) to housing 20. Locking mechanism 60 is removably attachable to wheel rim 18 to secure housing 20 to rim 18 during sealing of tire 12 to the rim. Locking mechanism 60 is operable between a locked position (shown in FIG. 2) and an unlocked position (shown in FIG. 3). Locking mechanism 60 includes a sliding member 62 that is slidably guided axially in relation to the housing 20 by a guide member 70. The guide member 70 is attached to housing 20 and flange 58. In the illustrated embodiment, guide member 70 is a hollow tube or sleeve. When in the locked position, sliding member 62 is in a fixed, retracted position relative to the housing 20.

The first end 64 of sliding member 62 includes an adjustable member 66. The adjustable member 66 secures sliding member 62 to rim 18. In the illustrated embodiment, the adjustable member 66 is a bolt or screw having a position that is adjustable by screwing it through end 64 of the sliding member 62. Because member 66 is adjustable, the tire sealing device can readily be used with different types and sizes of wheel rims. Other structures, other than a bolt or screw, could be used as the adjustable member.

Figure 3:
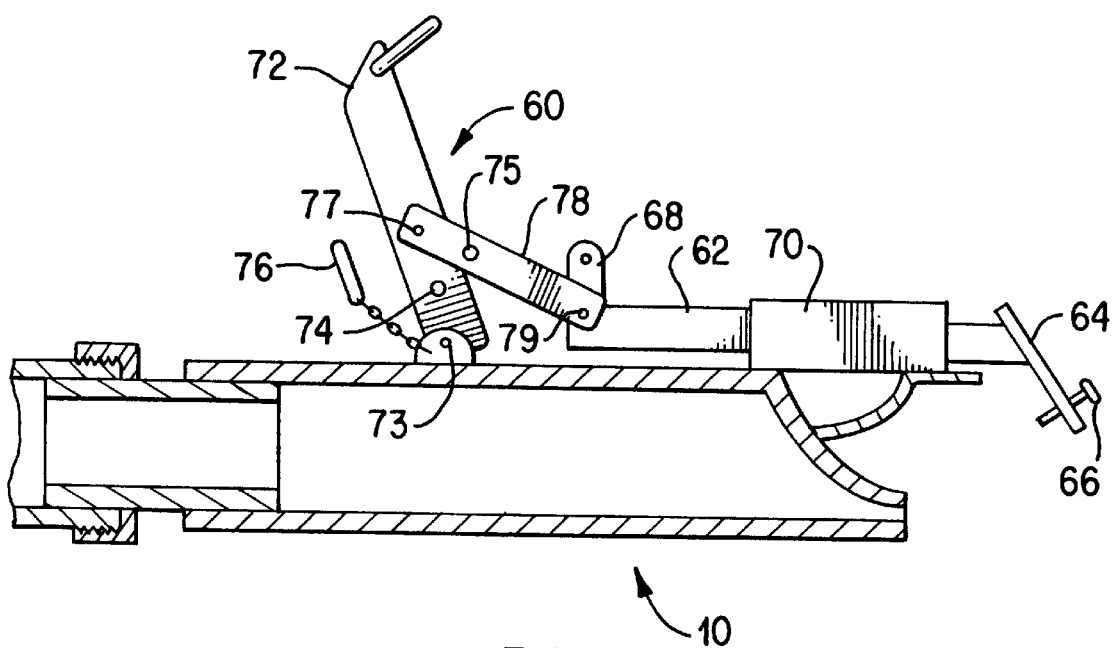
FIG. 3 is a view similar to FIG. 2, showing the tire sealing device in the unlocked position.

The structure that moves the sliding member 62 between the retracted (locked) position shown in FIG. 2 and the extended (unlocked) position shown in FIG. 3, will now be described. The second end 68 of sliding member 62 is connected to a handle member 72 by a linking member 78. Linking member 78 is pivotally attached to handle member 72 and to sliding member 62 at pivot points 77 and 79, respectively.

Handle member 72 is pivotally connected to housing 20 at pivot point 73 and is positionable between the locked and unlocked positions. When in the unlocked position, the handle member 72 extends upward from the housing 20 as shown in FIG. 3. This extends the sliding member 62 outward away from the nozzle 30 so that the nozzle 30 can be positioned between the tire and the wheel and the first end 64 and adjustable member 66 can be positioned within the wheel easily as shown, for example, in FIG. 5. The user then simply pushes the handle member 72 downward to the position shown in FIG. 2. This retracts the first end 64 of the sliding member towards the nozzle 30 so that the tire sealing device is clamped to the wheel. Any adjustment that might be necessary is facilitated by turning the adjustable member 66.

A locking member 76, for example a pin, can be placed in apertures 74 and 75 provided in the handle member 72 and the linking 78 member, respectively, thereby retaining the locking mechanism 60 in the locked position. The locking member 76 can be attached to housing 20, for example, by a chain. When the locking member 76 is removed, the locking mechanism 60 can be moved into the unlocked position, thereby allowing the tire sealing device 10 to disengage from the wheel rim 18.

FIG. 5 is a view showing the tire sealing device 10 positioned in relation to a wheel rim 18 and tire 12 to perform the operation of sealing the tire beads 14 against the rim 18. In operation, the user removes the locking member 76 from the apertures 74, 75 of the handle member 72 and the linking member 78. This allows the operator to pivot the handle member 72 into the unlocked position which in turn extends sliding member 62 such that adjustable member 66 may engage the wheel rim 18. The handle member 72 is then pivoted into the locked position thereby retracting sliding member 62 such that adjustable member 66 abuts rim 18. Locking member 76 can then be placed through the apertures 74, 75 thereby locking the locking mechanism 60 in the locked position.

The inflation tube 48 is attached to the valve stem 16 in the usual manner. If pressurized air is being supplied to the inflation tube, it will enter the tire. However, because the tire is not sealed to the wheel rim, the tire will not inflate.

The operator then turns valve 38 to the ON position, thereby allowing a blast of high pressure air to be discharged into housing 20. The air enters housing 20 through inlet passage 22 and passes through the first and second chambers 24, 26. The air then exits through first and second nozzles 32, 34 of the split nozzle 30 in diverging directions around the rim 18. The pressurized air instantaneously forces tire beads 14 to seal against the rim 18. The tire is then inflated via inflation tube 48. The tire can be fully inflated to the desired pressure or it can be inflated to a pressure sufficient to prevent the tire from unsealing from the wheel. If the pressure in housing 20 becomes too high, the pressure-relief valve 56 will open to prevent over-pressurization of the tire 12. The operator then turns valve 38 to the OFF position thereby cutting off the stream of pressurized air. The operator then disengages inflation tube 48 from tire valve 16. The operator then also removes locking member 76 from the apertures 74 and 75, thereby allowing the user to pivot the handle member 72 into the unlocked position. After the tire sealing device is removed, the tire can be further inflated to the desired pressure if necessary.

The tire sealing device can have a variety of sizes depending on its intended use. A device suitable for use with standard sized truck tires was built having a length of about 15 inches, a width of about 6 inches and a height of about 2 inches. This device weighed approximately 16 pounds. A smaller sized device would be suitable for automobile tires. A larger device and/or multiple devices could be used with tires for heavy earth moving equipment.

While this invention has been described in conjunction with a specific embodiment thereof, it is evident that many alternatives, modifications and variations will be apparent to those skilled in the art. Accordingly, the preferred embodiment of the invention as set forth herein is intended to be illustrative, not limiting. Various change may be made without departing from the spirit and scope of the invention as defined in the following claims.

What is claimed is:

1. A device for sealing a tubeless pneumatic tire to a wheel rim comprising:

an air-conveying housing having an inlet passage and a split outlet nozzle located at an end of the housing, the inlet passage being connectable to a source of pressurized air, the split outlet nozzle having at least one first opening directed in a first direction and at least one second opening directed in a second direction that diverges from the first directions, thereby ejecting the pressurized air supplied to the air-conveying housing through the inlet passage out of the device in two diverging directions so that when the split outlet nozzle is inserted between a tubeless pneumatic tire and a wheel rim on which the tire is mounted, air exiting the device through the split outlet nozzle will travel in opposite directions around the wheel rim and within the tire.

2. The device of claim 1, wherein the air-conveying housing includes a first chamber and a second chamber, each of which communicate with the inlet passage to receive pressurized air therefrom, the first chamber and the second chamber being linear and parallel to each other, and the split outlet nozzle includes a first outlet nozzle having the at least one first opening in communication with the first chamber and a second outlet nozzle having the at least one second opening in communication with the second chamber.

3. The device of claim 1, further comprising a pressure measuring gauge attached to the inlet passage, the pressure-measuring gauge measuring the pressure supplied through the split outlet nozzle.

4. The device of claim 1, further comprising an ON/OFF valve attached to the inlet passage, the ON/OFF valve being manually actuable to control the supply of pressurized air to the air-conveying housing.

5. The device of claim 1, further comprising a connector attached to the inlet passage, the connector including a first opening attachable to the source of pressurized air, a second opening attached to the inlet passage, and a third opening attached to a first end of an inflation tube, the inflation tube having a second end that includes a fitting that is attachable to a tire inflation valve located on the wheel rim.

6. The device of claim 5, further comprising a pressure-measuring gauge attached to the connector, the pressure-measuring gauge measuring the pressure supplied to the second and third openings of the connector.

7. The device of claim 1, further comprising a pressure-relief valve attached to the air-conveying housing and in fluid communication with the inlet passage, the pressure-relief valve opening when pressure within the air-conveying housing exceeds a maximum pressure.

8. The device of claim 1, further comprising a support flange attached to the air-conveying housing adjacent to the split outlet nozzle for engagement with the wheel rim to support the device during sealing of the tire to the wheel rim.

9. The device of claim 1, further comprising a locking mechanism attached to the air-conveying housing, the locking mechanism being removably attachable to the wheel rim to fixedly secure the air-conveying housing to the wheel rim during the sealing of a tire to the wheel rim.

10. A device for sealing a tubeless pneumatic tire to a wheel rim comprising:

an air-conveying housing having an inlet passage and an outlet nozzle located at an end of the housing, the inlet passage being connectable to a source of pressurized air, the outlet nozzle ejecting the pressurized air supplied to the air-conveying housing through the inlet passage out of the device in between a tubeless pneumatic tire and a wheel rim on which the tire is mounted when the outlet nozzle is inserted between the tire and the wheel rim; and a locking mechanism attached to the air-conveying housing, the locking mechanism including a wheel rim engaging member that is selectively movable toward and away from the end of the housing having the outlet nozzle between locked and unlocked positions, respectively; when in the locked position, the wheel rim engaging member and the end of the housing being spaced apart from each other by a first distance so as to capture an edge of the wheel rim to lock the device to the wheel rim; when in the unlocked position, the wheel rim engaging member and the end of the housing being spaced apart from each other by a second distance greater than the first distance so that the edge of the wheel rim is movable between the wheel rim engaging member and the end of the housing so as to be released from the device, so that the device is removably attachable to the wheel rim to fixedly secure the device to the wheel rim during the sealing of a tire to the wheel rim.

11. The device of claim 10, wherein the locking mechanism includes a sliding member that is movable between the locked position and the unlocked position, the position of the sliding member being fixed relative to the air-conveying housing when in the locked position and being movable relative to the air-conveying housing when in the unlocked position.

12. The device of claim 11, further comprising a guide member fixed to the air-conveying housing, the sliding member being slidably engaged with the guide member.

13. The device of claim 11, wherein the sliding member has first and second ends, the first end including the wheel rim engaging member which is engageable with the tire rim.

14. The device of claim 13, wherein the wheel rim engaging member is adjustable so that the locking mechanism is adjustable to different sized wheel rims.

15. The device of claim 13, wherein the locking mechanism also includes a handle member pivotally connected to the air-conveying housing, and a linking member having a first end pivotally connected to a second end of the sliding member and a second end pivotally connected to the handle member, the handle member being movable between two orientations to position the locking mechanism in one of the locked and unlocked positions.

16. The device of claim 15, wherein the locking mechanism further includes a locking member that locks the locking mechanism in the locked position.

17. The device of claim 16, wherein the handle member and the linking member have apertures that become aligned when the locking device is in the locked position, and wherein the locking member is a pin that is insertable through the aligned apertures.

18. The device of claim 10, wherein the air-conveying housing includes a first chamber and a second chamber, each of which communicate with the inlet passage to receive pressurized air therefrom, and the outlet nozzle is a split outlet nozzle having a first portion in communication with the first chamber and a second portion in communication with the second chamber.

19. The device of claim 10, further comprising a pressure-measuring gauge attached to the inlet passage, the pressure-measuring gauge measuring the pressure supplied through the outlet nozzle.

20. The device of claim 10, further comprising an ON/OFF valve attached to the inlet passage, the ON/OFF valve being manually actuable to control the supply of pressurized air to the air-conveying housing.

21. The device of claim 10, further comprising a connector attached to the inlet passage, the connector including a first opening attachable to the source of pressurized air, a second opening attached to the inlet passage, and a third opening attached to a first end of an inflation tube, the inflation tube having a second end that includes a fitting that is attachable to a tire inflation valve located on the wheel rim.

22. The device of claim 10, further comprising a pressure-relief valve attached to the air-conveying housing and in fluid communication with the inlet passage, the pressure-relief valve opening when pressure within the air-conveying housing exceeds a maximum pressure.

23. The device of claim 10, further comprising a support flange attached to the air-conveying housing adjacent to the outlet nozzle for engagement with the wheel rim to support the device during sealing of the tire to the wheel rim.

24. A device for sealing a tubeless pneumatic tire to a wheel rim comprising:

- an air-conveying housing having an inlet passage and a split outlet nozzle located at an end of the housing, the inlet passage being connectable to a source of pressurized air, the split outlet nozzle having at least one first opening directed in a first direction and at least one second opening directed in a second direction that diverges from the first direction, thereby ejecting the pressurized air supplied to the air-conveying housing through the inlet passage out of the device in two diverging directions so that when the split outlet nozzle is inserted between a tubeless pneumatic tire and a wheel rim on which the tire is mounted, air exiting the device through the split outlet nozzle will travel in opposite directions around the wheel rim and within the tire;
- an ON/OFF valve attached to the inlet passage, the ON/OFF valve being manually actuable to control the supply of pressurized air to the air-conveying housing;
- a connector attached to the inlet passage, the connector including a first opening attachable to the source of pressurized air, a second opening attached to the inlet passage, and a third opening attached to a first end of an inflation tube, the inflation tube having a second end that includes a fitting that is attachable to a tire inflation valve located on the wheel rim;
- a pressure-relief valve attached to the air-conveying housing and in fluid communication with the inlet passage, the pressure-relief valve opening when pressure within the air-conveying housing exceeds a predetermined pressure;
- a support flange attached to the air-conveying housing adjacent to the split outlet nozzle for engagement with the wheel rim to support the device during sealing of the tire to the wheel rim; and
- a locking mechanism attached to the air-conveying housing, the locking mechanism being removably attachable to the wheel rim to fixedly secure the air-conveying housing to the wheel rim during the sealing of a tire to the wheel rim, the locking mechanism being movable between a locked position and an unlocked position.

* * * * *